United States Patent Office 2,945,775
Patented July 19, 1960

2,945,775

SIZING OF PAPER WITH ACRYLAMIDE POLYMERS

Freeman R. Lehman, Lloyd H. Silvernail, and Elmer K. Stilbert, Midland, Mich., assignors to The Dow Chemical Company, Midland, Mich., a corporation of Delaware No Drawing. Filed Apr. 18, 1955, Ser. No. 502,191

5 Claims. (Cl. 117—155)

This invention relates to paper products and is particularly concerned with paper resistant to penetration by grease, oil and water and with a method for its preparation.

Numerous agents have been suggested for the sizing of paper products to improve their surface characteristics. For example, rosin, caesin, glue, starch and wax have been used in various combinations for improving paper surfaces for various purposes. In recent years, certain water-soluble polymers such as sodium alginate and sodium carboxymethyl-cellulose have been applied to paper or paper board as sizing agents to increase gloss ink hold-out and grease resistance. However, these polymers have the disadvantage that they reduce the resistance of the base sheet to penetration by water with the result that water-base inks wet and penetrate the treated paper readily, causing feathering and excessive absorption of ink.

It is an object of the present invention to provide an improved method for surface sizing paper or paper products. It is a further object to provide a method for sizing paper which will impart to the surface of the treated paper improved and desirable characteristics as regards its ink receptivity. Other objects will become apparent from the following specification and claims.

In accordance with the present invention, it has been discovered that the application of water-soluble high molecular weight polymers of acrylamide to paper results in improved surface characteristics for the paper or paper product. It is among the advantages of the invention that paper carrying a surface size of such acrylamide polymers displays desirable characteristics as regards receptivity, increased gloss ink hold-out and grease resistance with a simultaneous increase in resistance to feathering and penetration by water-based inks. It is a further advantage of the present invention that paper prepared in accordance therewith shows improved ink receptivity characteristics both for oil-based and water-based inks. In contrast most prior art surface sizing operations result in improved receptivity for one of the above types of ink while causing no improvement or even deterioration in receptivity characteristics for the other type of ink.

The acrylamide polymers effective in the present invention are water-soluble and have a low degree of cross-linking between polymer chains. Further, the effective polymers are characterized by a viscosity of at least about three centipoises for an aqueous 0.5 percent by weight solution of the polymer in distilled water adjusted to a pH of 3 to 3.5 and at a temperature of 25° C., as determined with an Ostwald viscosimeter. Wherever the term "viscosity" is hereinafter used, it refers to the viscosity of an aqueous 0.5 percent solution in accordance with the above description. The term "acrylamide polymer," as employed in the present specification and claims, is inclusive of the homopolymer of acrylamide and also copolymers of acrylamide with up to about 15 percent by weight of other suitable monomers such as acrylic and methacrylic acid and their alkyl esters, methacrylamide, styrene, vinyl acetate, acrylonitrile, methacrylonitrile, vinyl alkyl ethers, vinyl and vinylidene chloride and the like, each such polymer being characterized by water solubility and viscosity properties as described above.

Water-soluble acrylamide polymers are sometimes characterized by a gerater or less degree of hydrolysis, i.e. contain some free carboxyl groups. This condition is dependent upon the method of manufacture of the polymer, the presence or absence of small amounts of acrylic acid in the starting monomer and conditions of storage of the polymer. The polymer products appear to be equivalent whether the carboxyls result from copolymerization of acrylamide with acrylic acid or from hydrolysis of amide groups subsequent to polymerization. In the practice of the present invention, the operable acrylamide polymers encompass those having not more than about 15 percent of the amide groups replaced by carboxyl groups, as set forth in the above definition of operable polyacrylamide products.

In carrying out the present invention, the acrylamide polymer is dissolved in water and applied to a preformed paper surface in any suitable fashion. In general, the aqueous solutions of acrylamide polymer are adapted to application by conventional paper treating procedures such as tub sizing, the use of size rolls or presses or application in water boxes on the calender stacks. In such operations, the concentration of acrylamide polymer in the sizing solution may vary depending upon the type of paper to be treated, the degree of sizing desired and the viscosity of the particular polymer employed. In practice it has proved advantageous to employ a sizing solution containing from about 0.1 to 5 percent by weight of acrylamide polymer.

In preparing the sizing solution of acrylamide polymer, it is generally desirable to adjust the concentration of the solution in accordance with the viscosity of the particular polymer employed and it is preferred to adjust the concentration essentially in inverse proportion to the viscosity. Thus, for example, acrylamide polymers having viscosities of from about 3 to about 5 centipoises are employed in concentrations of from about 1 to 5 percent by weight. With increasing viscosity of the acrylamide polymer, lower concentrations thereof are employed in the sizing solution. Thus, for example, polymers having viscosities of from about 5 to about 10 are employed at concentrations of from about 0.5 to 3 percent by weight and polymers with viscosities greater than 10 at concentrations of from about 0.1 to 2 percent by weight.

The amount of acrylamide polymer to be employed will vary depending upon such factors as the particular type of paper stock, the end-use for the sized paper and the viscosity of the acrylamide polymer employed. In general, good results are obtained when employing from about 0.4 to 20 pounds and preferably from about 1.0 to 4 pounds of acrylamide polymer per million square inches of paper surface treated. This corresponds to single side surface sizing at rates of from about 0.2 to 10 pounds and preferably from about 0.5 to 2 pounds of polymer per TAPPI standard ream.

The desired degree of improvement in receptivity characteristics will vary depending on such factors as the type of paper stock and the end-use for the paper product. In general it is desired to eliminate feathering essentially completely and for most uses the receptivity has been found to be significantly improved when the surface size application results in an increase in penetration time for water-based ink of at least about 20 percent over the base stock and to a minimum of about 10 seconds in the TAPPI standard ink flotation test.

The following examples illustrate the invention but are not to be construed as limiting the same. Procedures herein identified by the designation "TAPPI" refer to standard methods published as Testing Methods, Recommended Practices, Specifications, by the Technical Association of the Pulp and Paper Industry.

*Example 1*

An acrylamide polymer having a viscosity of 7.8 centipoises was dissolved in water to prepare a surface size solution containing 2.5 percent by weight of the polymer. This solution was applied as a single-side coating to weighed base stock paper sheets conditioned for a minimum of 24 hours in a constant temperature and humidity chamber at 75° C. and 50 percent humidity. The application was made by a standard rod draw-down method. In this method of application the polymer solution was poured onto the paper along one side of a 0.25 inch diameter stainless steel rod wound with stainless steel wire of 8 mils diameter and the rod was drawn over the paper sheet in a direction perpendicular to the axis of the rod to deposit a substantially uniform coating of the surface size solution. Thereafter the sized paper was dried in a forced air oven at 180° F. and the dried sheets conditioned as above and weighed to determine the coating weight. The conditioned, coated paper was submitted to determinations of feathering, K and N gloss ink hold-out and water-based ink flotation penetration according to TAPPI Routine Control Methods 74, 19 and 14, respectively. The results are recorded in the following table in comparison with the results of similar determinations on the unsized base stock.

| Coating Weight, Pounds per TAPPI Ream | Feathering | Water-based Ink Flotation, Seconds to Penetrate | K and N Gloss Ink Hold-Out |
|---|---|---|---|
| 0.3 | None | 300 | Good. |
| None | Excessive | 72 | Poor. |

The base stock employed above was a moderately heavy paper free of surface size and prepared from bleached sulfite pulp.

*Example 2*

Acrylamide polymers having viscosities of 1.05 centipoises and 3.4 centipoises were separately dissolved in water to prepare solutions containing 2.5 percent by weight of polymer. These solutions were applied to a commercial, 51 pound per ream, base stock, prepared from bleached sulfite pulp and characterized by rapid penetration and feathering with water-based inks. The application of the polymer solutions was carried out by the rod draw-down technique as in Example 1, using a rod wound with wire of 4 mils diameter to apply the polymer at a rate of 0.1 pound per ream and a rod wound with 8 mil wire to apply 0.2 pound per ream. Drying of the treated paper, conditioning and determination of coating weight and feathering were carried out as in Example 1. The results are set forth in the following table.

| Viscosity of Acrylamide Polymer, Centipoises | Coating Weight, Pounds per TAPPI Ream | Feathering Characteristics |
|---|---|---|
| 1.05 | 0.1 | Feathers. |
| 1.05 | 0.2 | Do. |
| 3.4 | 0.2 | No Feathers. |
|  | None | Feathers. |

*Example 3*

An acrylamide polymer having a viscosity of 3.2 centipoises is dissolved in water to prepare a surface size solution containing 5 percent by weight of the polymer. This solution is applied on a size press at a coating weight of 0.2 pound of polymer per TAPPI ream to a base stock prepared from reclaimed paper mixed with chemical pulp. The surface size is rapidly dried and the resulting paper, after conditioning, is submitted to determinations for feathering and K and N gloss ink hold-out by the methods of Example 1. The surface sized paper shows no feathering with water-based ink and marked improvement in gloss ink hold-out as compared to excessive feathering and heavy absorption of gloss ink by an unsized portion of the same base stock.

*Example 4*

Acrylamide polymers having various viscosities were dissolved in water to prepare surface size solutions containing various concentrations of polymer. These solutions were applied to a commercial bleached sulfite base stock paper having a basis weight of 51 pounds per TAPPI ream, using the rod draw-down technique of Example 1. The rods were wound with varying diameters of wire chosen to provide the desired coating weight. The base stock employed was lightly slack-sized on one side and the acrylamide polymer solution was applied to the unsized side of the stock. Following the application of the surface size, the paper was dried and conditioned and submitted to feathering determinations as in Example 1. Similar determinations were run on the untreated base stock. The coating weight of surface size was determined as in Example 1. The results were summarized in the following table.

| Viscosity of Polymer, Centipoises | Percent by Weight of Polymer in Size Solutions | Coating weight, Pounds per TAPPI Ream | Feathering |
|---|---|---|---|
|  |  | None | Excessive. |
| 6.9 | 2.5 | 0.5–0.6 | None. |
| 6.9 | 2.5 | 0.7–0.8 | Do. |
| 6.9 | 2.5 | 1.5–1.7 | Do. |
| 10.2 | 2.0 | 0.2–0.3 | Do. |
| 10.2 | 2.0 | 0.5–0.6 | Do. |
| 10.2 | 2.0 | 0.7–0.8 | Do. |
| 10.2 | 2.0 | 1.1–1.3 | Do. |
| 11.9 | 1.5 | 0.2–0.3 | Do. |
| 11.9 | 1.5 | 0.5–0.6 | Do. |
| 11.9 | 1.5 | 0.7–0.8 | Do. |
| 11.9 | 1.5 | 0.9–1.1 | Do. |

*Example 5*

Surface sized paper prepared in accordance with Example 4 was submitted to determinations of K and N gloss ink hold-out and water-based ink penetration using the TAPPI methods specified in Example 1. The results are summarized in the following table.

| Viscosity of Polymer, Centipoises | Coating Weight, Pounds per TAPPI Ream | K and N Gloss Ink Hold-out | Seconds for Water-based Ink to Penetrate |
|---|---|---|---|
| 6.9 | 0.7–0.8 | 2 | 124 |
| 6.9 | 1.5–1.7 | 4 | 150 |
| 10.2 | 0.7–0.8 | 2 | 120 |
| 10.2 | 1.1–1.3 | 3 | 155 |
| 11.9 | 0.7–0.8 | 2 | 100 |
| 11.9 | 0.9–1.1 | 3 | 150 |
|  | None | 0 | 2 |

The gloss ink hold-out results above are reported on an arbitrary scale where 0 indicates heavy ink absorption, 1 indicates detectable but generally unsatisfactory hold-out, 2 indicates significant improvement, 3 indicates very marked improvement and 4 indicates exceptional hold-out. The improvements in receptivity properties were accomplished with no detectable decrease in such desirable properties as burst strength, tear strength and resistance to folding as determined by standard methods.

We claim:

1. In a method for simultaneously increasing the resistance of paper to penetration by grease and oil and by water-based inks, the step of applying to a preformed paper product an aqueous solution of an acrylamide polymer, said polymer being characterized by a viscosity of at least about 3 centipoises for an aqueous 0.5 percent by weight solution of the polymer in distilled water adjusted to a pH of 3 to 3.5 and at a temperature of 25° C. and being employed in the amount of from about 0.2 to 10 pounds per TAPPI ream and said applied solution comprising from about 0.1 to 5 percent by weight of the polymer, the exact percent being inversely proportional to the viscosity of the polymer.

2. In a method for simultaneously increasing the resistance of paper to penetration by grease and oil and by water-based ink, the step of applying to a preformed paper product an aqueous solution of an acrylamide polymer, said polymer being characterized by a viscosity of at least about 3 centipoises for an aqueous 0.5 percent by weight solution of the polymer in distilled water adjusted to a pH of 3 to 3.5 and at a temperature of 25° C. and being employed in the amount of from about 0.5 to 2 pounds of the polymer per TAPPI ream.

3. A process for the manufacture of paper which comprises the steps of forming a paper web from an aqueous suspension of cellulosic pulp, pressing and drying said web and applying to the surface of the dried web an aqueous solution of an acrylamide polymer, said polymer being characterized by a viscosity of at least 3 centipoises for an aqueous 0.5 percent by weight solution of the polymer in distilled water adjusted to a pH of 3 to 3.5 and at a temperature of 25° C. and being employed in the amount of from about 0.2 to 10 pounds TAPPI ream and said applied aqueous solution comprising from about 0.1 to 5 percent by weight of the polymer, the exact percent being inversely proportional to the viscosity of the polymer.

4. In a method for simultaneously increasing the resistance of paper to penetration by grease and oil and by water-based inks, the step of applying to the preformed paper an aqueous solution of an acrylamide polymer, said polymer being characterized by a viscosity of at least about 3 centipoises for an aqueous 0.5 percent by weight solution of the polymer in distilled water adjusted to a pH of 3 to 3.5 and at a temperature of 25° C.

5. In a method for simultaneously increasing the resistance of paper to penetration by grease and oil and by water-based inks, the step of applying to a preformed paper product an aqueous solution of an acrylamide polymer, said polymer being characterized by a viscosity of at least about three centipoises for an aqueous 0.5 percent by weight solution of the polymer in distilled water adjusted to a pH of 3 to 3.5 and at a temperature of 25° C. and being deposited on the paper in the amount of at least about 0.2 pound per TAPPI ream.

References Cited in the file of this patent

UNITED STATES PATENTS

| | | |
|---|---|---|
| 2,343,095 | Smith | Feb. 29, 1944 |
| 2,406,454 | Charlton | Aug. 27, 1946 |
| 2,526,638 | Coperg | Oct. 24, 1950 |
| 2,540,352 | Schenck | Feb. 6, 1951 |
| 2,616,818 | Azorlosa | Nov. 4, 1952 |
| 2,661,309 | Azorlosa | Dec. 1, 1953 |
| 2,721,140 | Weisgerber | Oct. 18, 1955 |
| 2,748,029 | Spear | May 29, 1956 |
| 2,801,169 | Lundberg | July 30, 1957 |